(12) United States Patent
Byun et al.

(10) Patent No.: US 8,239,396 B2
(45) Date of Patent: Aug. 7, 2012

(54) VIEW MECHANISM FOR DATA SECURITY, PRIVACY AND UTILIZATION

(75) Inventors: Ji-Won Byun, Redwood City, CA (US); Chi Ching Chui, San Ramon, CA (US); Daniel M. Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 312 days.

(21) Appl. No.: 12/408,551

(22) Filed: Mar. 20, 2009

(65) Prior Publication Data

US 2010/0241641 A1   Sep. 23, 2010

(51) Int. Cl.
*G06F 17/30* (2006.01)

(52) U.S. Cl. ........................................ 707/757; 707/756

(58) Field of Classification Search .................. 707/756, 707/757
See application file for complete search history.

(56) References Cited

U.S. PATENT DOCUMENTS

| | | |
|---|---|---|
| 5,133,075 A | 7/1992 | Risch |
| 5,241,305 A | 8/1993 | Fascenda et al. |
| 5,265,221 A | 11/1993 | Miller |
| 5,276,901 A | 1/1994 | Howell et al. |
| 5,428,778 A | 6/1995 | Brookes |
| 5,499,368 A | 3/1996 | Tate et al. |
| 5,748,899 A | 5/1998 | Aldrich |
| 5,751,949 A | 5/1998 | Thomson et al. |
| 5,765,154 A | 6/1998 | Horikiri et al. |
| 5,787,428 A | 7/1998 | Hart |
| 5,815,574 A | 9/1998 | Fortinsky |
| 5,832,226 A | 11/1998 | Suzuki et al. |
| 5,848,408 A | 12/1998 | Jakobsson et al. |
| 5,864,842 A | 1/1999 | Pederson et al. |
| 5,940,818 A | 8/1999 | Malloy et al. |
| 5,963,932 A | 10/1999 | Jakobsson et al. |
| 6,026,388 A | 2/2000 | Liddy et al. |
| 6,098,081 A | 8/2000 | Heidorn |
| 6,134,549 A | 10/2000 | Regnier et al. |
| 6,253,203 B1 | 6/2001 | O'Flaherty et al. |
| 6,275,824 B1 | 8/2001 | O'Flaherty et al. |

(Continued)

FOREIGN PATENT DOCUMENTS

EP   1 089 194 A1   4/2001

(Continued)

OTHER PUBLICATIONS

Stonebraker Michael, et al., "Access Control in a Relational Data Base Management System by Query Modification," ACM/CSE-ER, 1974, XP-002319462, pp. 180-186.

(Continued)

*Primary Examiner* — Shahid Alam
*Assistant Examiner* — Jagdish Pandya
(74) *Attorney, Agent, or Firm* — Hickman Palermo Truong Becker Bingham Wong LLP

(57) ABSTRACT

A machine-implemented method and machine-readable media for transforming sensitive data in a database is provided. Sensitive data in the database are transformed based on a query context of a query. The query may also be transformed. The transformed query may be applied against the transformed sensitive data to construct a query result. The query result with the transformed sensitive data represents a lenticular view. The lenticular view represents a modified form of the sensitive data that an end-user is allowed access to.

14 Claims, 5 Drawing Sheets

U.S. PATENT DOCUMENTS

| | | | |
|---|---|---|---|
| 6,275,825 B1 | 8/2001 | Kobayashi et al. | |
| 6,308,273 B1 | 10/2001 | Goertzel et al. | |
| 6,363,387 B1 | 3/2002 | Ponnekanti et al. | |
| 6,449,609 B1 | 9/2002 | Witkowski | |
| 6,487,552 B1 | 11/2002 | Lei et al. | |
| 6,493,722 B1 | 12/2002 | Daleen et al. | |
| 6,539,398 B1 | 3/2003 | Hannan et al. | |
| 6,578,037 B1 | 6/2003 | Wong et al. | |
| 6,587,854 B1 | 7/2003 | Guthrie et al. | |
| 6,609,121 B1 | 8/2003 | Ambrosini et al. | |
| 6,618,721 B1 | 9/2003 | Lee | |
| 6,631,371 B1 | 10/2003 | Lei et al. | |
| 6,678,822 B1 | 1/2004 | Morar et al. | |
| 6,684,227 B2 | 1/2004 | Duxbury | |
| 6,757,670 B1 | 6/2004 | Inohara et al. | |
| 6,763,344 B1 | 7/2004 | Osentoski et al. | |
| 6,813,617 B2 | 11/2004 | Wong et al. | |
| 6,847,998 B1 | 1/2005 | Arcieri et al. | |
| 6,920,457 B2 | 7/2005 | Pressmar | |
| 6,986,060 B1 | 1/2006 | Wong | |
| 6,996,557 B1 | 2/2006 | Leung et al. | |
| 7,117,197 B1 | 10/2006 | Wong et al. | |
| 7,310,647 B2 | 12/2007 | Lei et al. | |
| 7,440,963 B1* | 10/2008 | Bello et al. | 1/1 |
| 7,509,684 B2* | 3/2009 | McDonald et al. | 726/26 |
| 2001/0021929 A1 | 9/2001 | Lin et al. | |
| 2002/0095405 A1 | 7/2002 | Fujiwara | |
| 2003/0014394 A1 | 1/2003 | Fujiwara et al. | |
| 2003/0236781 A1 | 12/2003 | Lei et al. | |
| 2003/0236782 A1 | 12/2003 | Wong et al. | |
| 2004/0139043 A1 | 7/2004 | Lei et al. | |
| 2004/0254948 A1 | 12/2004 | Yao | |
| 2005/0050046 A1 | 3/2005 | Puz et al. | |
| 2005/0177570 A1 | 8/2005 | Dutta et al. | |
| 2005/0198074 A1* | 9/2005 | Khayter et al. | 707/104.1 |
| 2008/0114785 A1 | 5/2008 | Bernstein et al. | |

FOREIGN PATENT DOCUMENTS

JP    2002/312220    10/2002

OTHER PUBLICATIONS

Keefe T.L. et al, "Secure Query-Processing Strategies," IEEE, No. 3, Mar. 1989, XP 000122365, pp. 63-70.

International Search Authority, "Notification of Transmittal of the International Search Report and the Written Opinion of the International Searching Authority, or the Declaration," International Application No. PCT/US2004/043480, Apr. 22, 2005, 12 pages.

Current Claims of International Application No. PCT/US2004/043480, pp. 1-6.

International Preliminary Examining Authority, "Written Opinion", PCT/US2003/041541, mailing date Sep. 1, 2005, 6 pages.

Current Claims, PCT/US2003/041541, 3 pages.

Motro, Amihai, "An Access Authorization Model for Relational Databases Based on Algebraic Manipulation of View Definitions," Data Engineering, 1989, XP010015183.

U.S. Appl. No. 11/781,139, filed Jul. 20, 2007, Final Office Action.

* cited by examiner

VIEW MECHANISM FOR DATA SECURITY, PRIVACY AND UTILIZATION

FIELD OF THE INVENTION

The present invention relates to controlling access to sensitive data.

BACKGROUND

A database server stores data in one or more data containers, each container contains records, and the data within each record is organized into one or more fields. In a database system that stores data in a relational database, the data containers are referred to as tables, the records are referred to as rows, and the attributes are referred to as columns. In object oriented databases, the data containers are referred to as object classes, the records are referred to as objects, and the attributes are referred to as object attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A database server retrieves and manipulates data in response to receiving a database statement. Typically the database statement conforms to a database language, such as Structured Query Language (SQL). A database statement can specify a query operation, a data manipulation operation, or a combination thereof. A database statement that specifies a query operation is referred to herein as a query. The present invention is not limited to database statements that specify a particular type of operation. However, for the purpose of explanation, embodiments of the present invention are illustrated using queries.

One function of a database server is to control access to sensitive database data. Security mechanisms on database servers control what data may be accessed by a query issued by an end-user. A database may have much sensitive data that is regulated by law or other policy requirement. For example, such sensitive data may be customer data or employee data. Regulations may restrict access of the sensitive data to only qualified parties. A database user, such as a corporation or government entity, may need to find ways to comply with regulatory or policy requirements regarding data privacy and security. When a database user allows parties to access a database storing sensitive data, the database user must ensure that the parties, as end-users of the database, do not have access to more information than is allowed.

Some database technologies attempt to provide privacy protections for sensitive data stored in a database. For example, according to one technique, sensitive data is protected by overwriting copies of the sensitive data with random data so that an end-user may not view disallowed data. However, such an all-or-nothing "binary" approach provides the end-user with zero feedback regarding the sensitive data when the sensitive data is protected. Such overwriting of sensitive data may be performed in a "static" manner, which means the sensitive data is overwritten prior to handling queries for the sensitive data.

According to another technique, sensitive data is protected by partially modifying the sensitive data. However, an end-user will need to be aware of the specific techniques used to modify the original sensitive data to the partially modified sensitive data in order to query the partially modified sensitive data. Other techniques will add an extra predicate to a query for filtering sensitive data. These techniques lack flexibility and fine-grained access control for enhanced protection of sensitive data with maximized utility of such sensitive data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
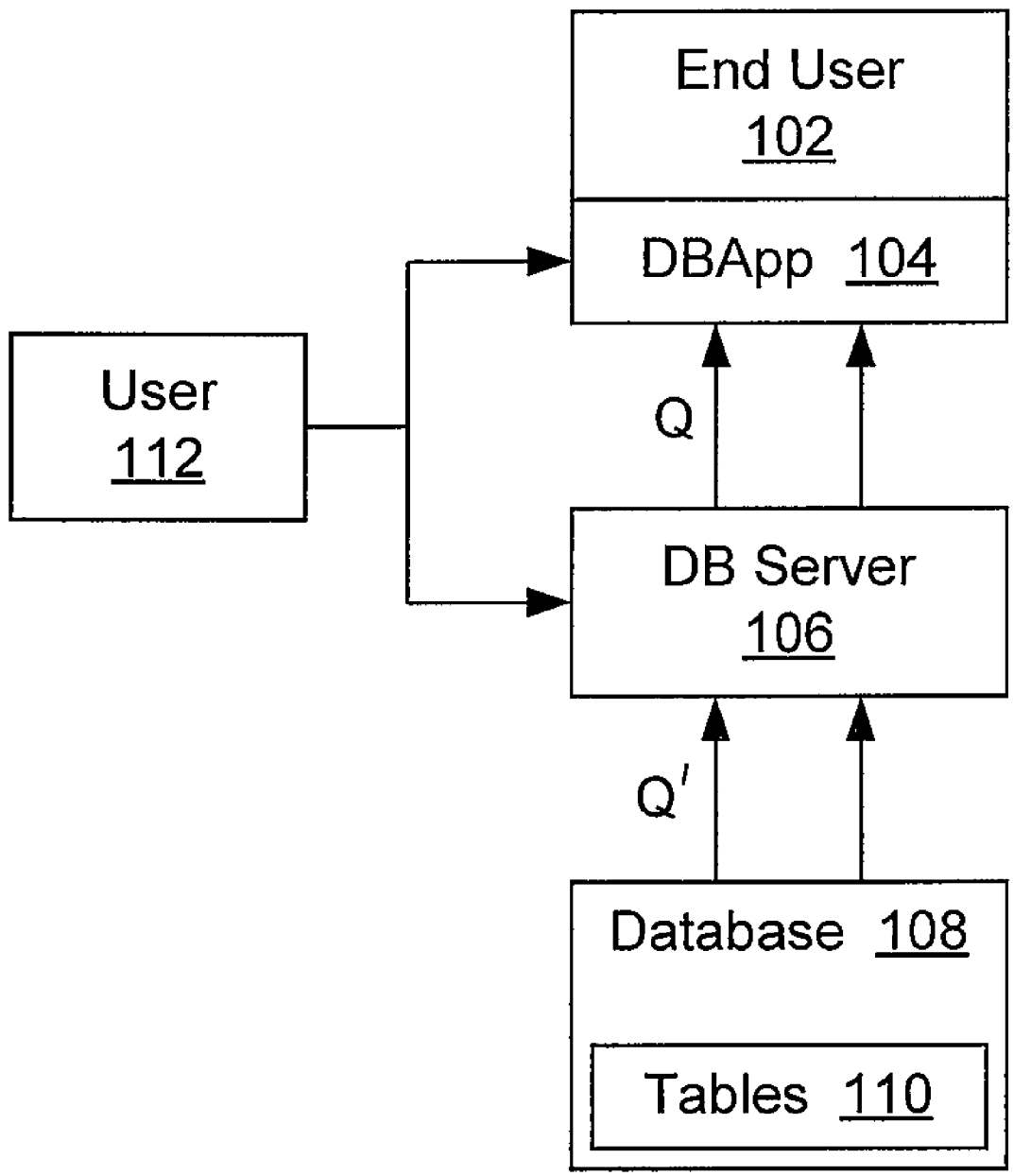
FIG. 1 is a block diagram illustrating an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

To overcome the shortcomings of previous privacy protection and security techniques, a technique is described herein for creating and using lenticular views. In an embodiment, for an issued query, an end-user that issues the query to a database server has access to one "lenticular view" of sensitive data in the database. A lenticular view is a particular combination of columns of a table in the database transformed by one or more transformation techniques, combined with zero, one, or more than one untransformed columns from the database. In a lenticular view, the sensitive data of the database is modified, or transformed, according to a query context of the issued query, so that an end-user may only see sensitive data in the particular modified form allowed for the end-user. The query context of the query will determine the transformation of the sensitive data. Thus, a query that is issued multiple times from the end-user to the database server, each time with a different query context, will cause the database server to transform the sensitive data differently each time. Each different transformation of sensitive data corresponds to a separate lenticular view which presents the sensitive data in the particular modified form that the end-user is allowed to see.

The query context of an issued query is the conditions under which the query is issued by the end-user and received by the database server. Query context includes, but is not limited to, any combination of the identity of the end-user, the role of the end-user, and session attributes. In addition, query context may also include, but is not limited to, any combination of other contextual information such as the purpose of the query, the identity of the end-user and associated roles or privileges for the end-user, how often the same query has been issued, where the query was issued, and the time and date the query was issued. For example, query context may include whether the query issued from the marketing or payroll department application. Query context may also include other information regarding the conditions under which the query was issued not specifically listed herein.

An user, such as a privacy administrator, defines rules, as part of a policy, that are enforced by a privacy enforcement operator. The privacy enforcement operator may be a component part of the database server. The rules determine how a database server selects transformation techniques for transforming sensitive data, depending on the query context. A user may specify any number of transformation techniques for each column of a table and any number of lenticular views for each table in a database.

In an embodiment, the database server transforms the values in a column of a table in the database to generate transformed values to use as the values in the column in lieu of the actual values stored in the column. The column may contain sensitive data that should be transformed. The database server changes, or transforms, the values in the column of the database table prior to using the newly transformed data values of the column to answer the issued query. To provide the query result, the database server uses the transformed values instead of the values that existed in the column prior to transformation. The database server may transform multiple columns of data according to one or more transformation techniques.

In an embodiment, the database server may change the form of data in a column when transforming the data according to a selected transformation technique. The selected transformation technique changes the value domain of the data in the column. The database server rewrites the query to reflect the new value domain of the selected transformation technique. In an embodiment, the database server rewrites, or transforms, the issued query to a "transformed query" for retrieving transformed data. The database server rewrites the issued query to match the new value domain of transformed data. The database server applies the transformed query against the transformed data to retrieve a query result.

For example, the end-user may issue a query "SELECT * FROM employee WHERE age=14". This example query is a request from the end-user to the database server to retrieve data regarding all employees, listed in an employee table, that are age 14. The employee table has a name column that has literal values and an age column with numeric values. For example, the name and age values may be "John Henry", with age "14", and "Betty Smith", with age "24". For some lenticular views a database server may change the numeric age values in the age column to a literal, in a new value domain, that is one of "minor", "adult", or "retiree". The new age values for "John Henry" and "Betty Smith" are literal values in a literal value domain. After transformation of the data, "John Henry" will have a transformed age value in the age column of "minor", and "Betty Smith" will have a transformed age value in the age column of "adult". In this example, the transformed data in the age column are the values that the database server uses as the values in the column in lieu of the actual values stored in the column.

If the issued query refers to age in the query predicate, such as "WHERE age=14" then the query predicate will be transformed to "WHERE age=minor" to match the new value domain of the age column. The database server changes the value domain of the predicate in the issued query, as received from the end-user, before processing the query. The transformed query is "SELECT * FROM employee WHERE age=minor". If the database server does not change the value domain of the predicate, the untransformed query applied against the transformed age column will not match any rows with respect to the transformed age column, since the employees are no longer associated with numeric age values, which leads to an incorrect query result.

In an embodiment, for a relational database, the database server transforms the data in a table column according to a transformation technique that is selected from one or more transformation techniques registered for the table column. The use of the transformed query and the transformed data to retrieve a query result transparently adheres to privacy policies set by the user. In some embodiments, no modification of a database application used by the end-user is necessary in order to comply with privacy and security requirements, since the requirements are reflected in the transformation techniques of the lenticular views.

Although the techniques described herein are for privacy protection and security, other uses of the techniques described herein may be possible, including any use that requires transformation of data in a database.

Architectural Overview

FIG. 1 is a block diagram illustrating an embodiment. In FIG. 1, an end-user 102 interacts with a database application 104. The database application 104 executes by communicating with a database server 106. The database server 106 retrieves data from database 108. Tables 110 with sensitive data are stored in database 108. A user 112 specifies transformation techniques and registers transformation techniques with database server 106. User 112 may also create database applications, such as database application 104, that utilizes and processes sensitive data from tables 110. In some embodiments, specifying and registering transformation techniques may be performed by one party, such as a "privacy administrator" and creating database applications is performed by another party.

Processing Queries with Lenticular Views

Figure 2:
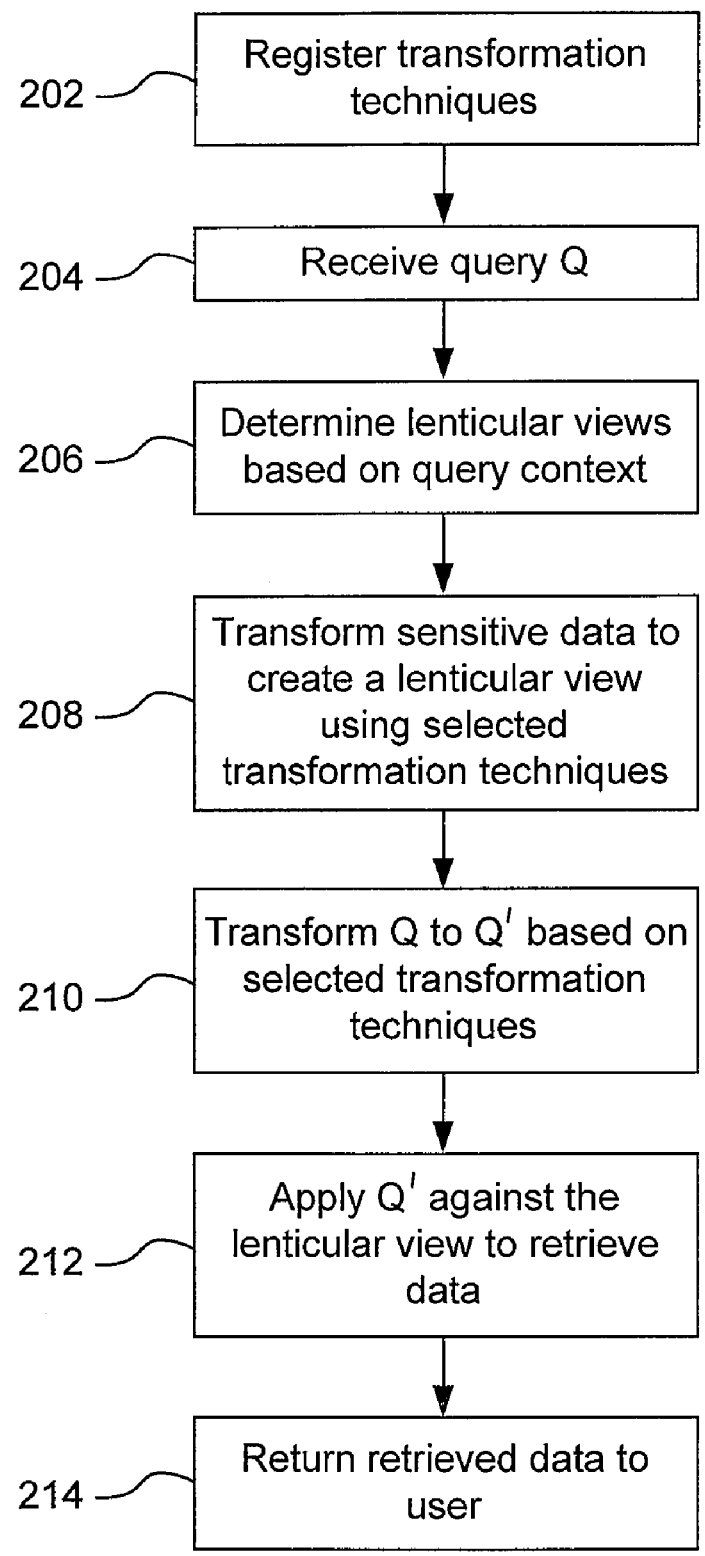
FIG. 2 is a flow diagram illustrating a technique for processing queries using lenticular views, according to an embodiment.

FIG. 2 is a flow diagram illustrating a technique for processing queries using lenticular views, according to an embodiment. The steps of FIG. 2 may be performed in an order other than the order shown in FIG. 2. In some embodiments, not all steps of FIG. 2 are performed.

In step 202 of FIG. 2, database server 106 registers transformation techniques. Registration of a transformation technique occurs prior to processing any query that requires use of the transformation technique. A transformation technique corresponds to a way to change data so that the data is appropriate for viewing by end-user 102, according to privacy and security requirements as set by the user 112. Each transformation technique is associated with a specific data column in one of the tables of tables 110. User 112 uses rules to associate each transformation technique with one or more query contexts. Multiple different query contexts may be associated with the same transformation technique.

In some embodiments, user 112 specifies, for each data column of tables 110 with sensitive data, a customized transformation technique. For example, for a table T, database server 106 may register transformation techniques TC0, TC1, TC2, TC3 for a column C, of table T, that stores Social Security numbers of employees, and transformation techniques TD0, TD1, TD2, and TD3 for a column D, of table T, that stores the ages of employees. TC1 may change the first five digits of a Social Security number to asterisks, leaving only the last four digits of the Social Security number unchanged. TD1 may replace the actual age of the employee with an age range. TC0 and TD0 are transformation techniques that perform no change on the data. TC2 and TC3 may be transformation techniques that change the Social Security number data of column C in yet other different ways. TD2 and TD3 may be other transformation techniques that change the age data of column D in yet other different ways.

A query context, such as "end-user is human resource personnel" may be associated with TC0 and TD0. User 112 indicates to database server 106 the transformation techniques that should be used for particular query contexts, during the registration of transformation techniques with database server 106. When end-user 102 is a person from the human resource department, then end-user 102 is allowed access to the lenticular view that contains untransformed data, because TC0 and TD0 specifies that no changes are to be made to the data. On the other hand, another query context, such as "query was issued from a subsidiary company" may be associated with TC3 and TD3. TC3 specifies replacing all the digits of Social Security numbers in column C with asterisks. TD3 maps the age of the employees in column D to one of "minor", "adult", or "retiree". A query context can also be any combination of other query context, such as "end-user is human resource personnel and query was issued from a subsidiary company".

In step 204, database server 106 receives query Q through database application 104, from end-user 102. In step 206, database server 106 selects the appropriate transformation techniques based on the query context of query Q. Database server 106 enforces privacy protection and security by choosing the appropriate transformation techniques based on the query context.

In step 208, in embodiments with dynamic transformation of the sensitive data, the database server 106 transforms sensitive data in tables 110 to create lenticular views in response to receiving the issued query. In some embodiments, the data has already been transformed, and the lenticular views have already been materialized and stored in database 108, so that transformation is no longer necessary at this stage.

In step 210, database server 106 transforms query Q to modified query Q' based on the query context of the query Q and the selected transformation techniques.

In step 212, database server 106 applies modified query Q' to retrieve data from database 108. Some of the data retrieved from database 108 are sensitive data in tables 110. However, tables 110 may contain both sensitive and non-sensitive data.

In step 214, database server 106 returns to database application 104, as a query result, data selected from database 108. Database application 104 returns the query result to end-user 102.

Matching Query Context to Transformation Technique

Rules set up by user 112 indicate to database server 106 the specific query contexts that will cause specific transformation techniques to apply. In some embodiments, rules are built into the definition of each transformation technique registered with database server 106. In one aspect of the invention, rules match various query contexts with transformation techniques. For example, assume that a database column C stores Social Security numbers of employees. One rule may be that if someone from a marketing department issues a query, then Social Security numbers must be transformed according to transformation technique TC3. TC3 may transform the Social Security number so that every digit of the Social Security number is replaced with an asterisk. TC3 hides the Social Security number so that no data in column C is available to end-user 102.

On the other hand, another rule may be that if, as part of the query context, someone from the payroll department issues a query as end-user 102, then the full Social Security numbers are provided to end-user 102 according to transformation technique TC0. TC0 specifies that no changes are made to the data. Thus, no transformation is applied to column C, and untransformed Social Security numbers are provided to end-user 102 in a query result.

A third rule may be that if someone from technical support issues a query as end-user 102, then the Social Security numbers must be transformed according to transformation technique TC1. TC1 changes the first five digits of the Social Security number, and only the last four digits of the Social Security number are shown to technical support personnel, and thus some personal information is revealed when using TC1.

Lenticular View Conceptual Model

Figure 3:
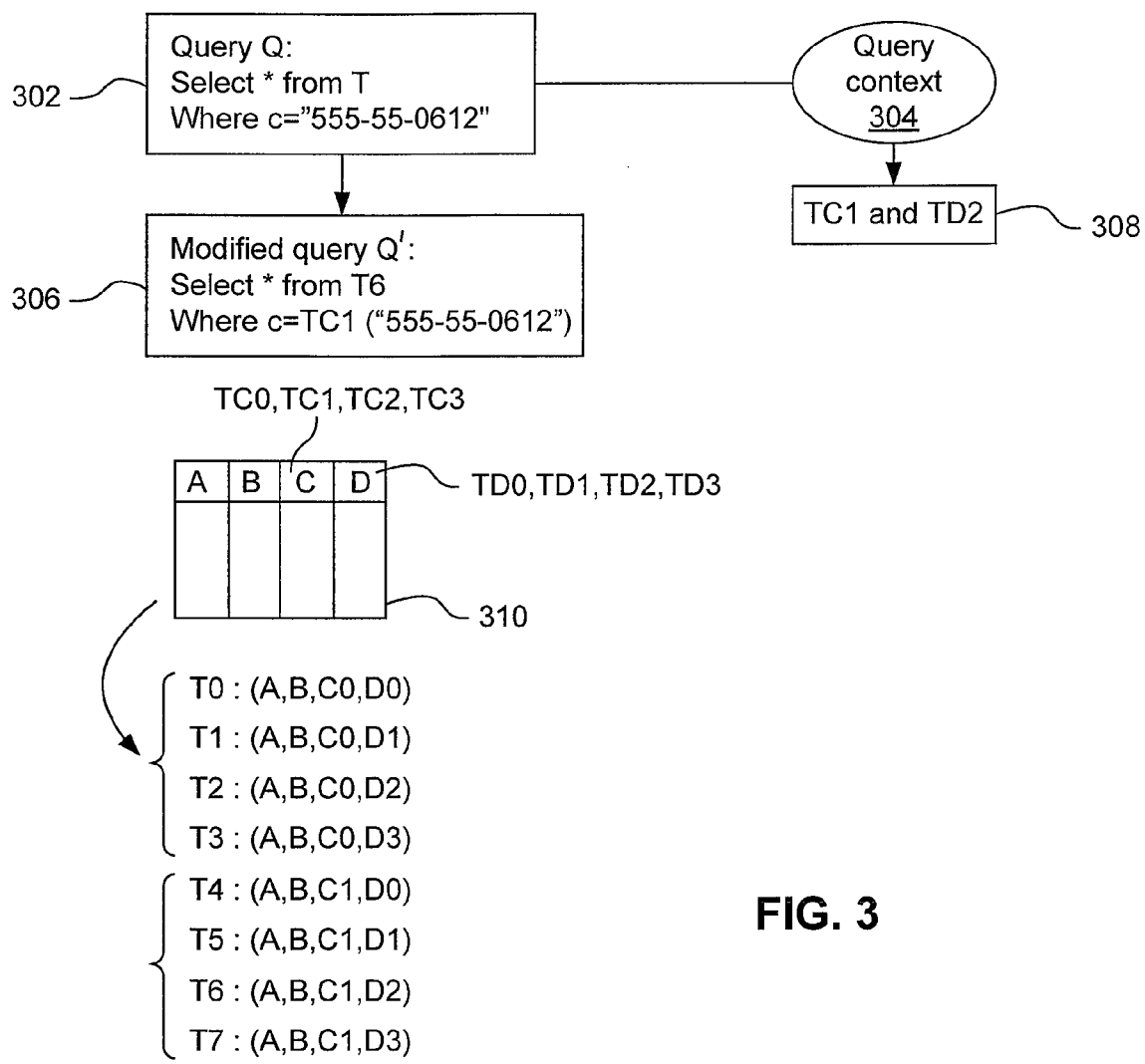
FIG. 3 is a block diagram illustrating a technique for transformations, according to an embodiment.

FIG. 3 is a block diagram illustrating a technique for transformations, according to an embodiment. In the example of FIG. 3, a query Q 302 is a query issued by end-user 102 that is not yet transformed. Database server 104 may transform query Q 302 to a modified query Q' 306. Database server 104 uses a query context 304 to select transformation techniques TC1 and TD2 308 to protect the sensitive data of columns C and D according to rules set by user 112. The selection of transformation techniques TC1 and TD2 308 represent a privacy policy specified by user 112 that is applied to query context 304. Columns A and B do not contain sensitive data, and no transformation of columns A and B is required as any end-user may view columns A and B under any query context. Although FIG. 3 depicts that each lenticular view has four (4) registered transformation technique per column, each column may have as many registered transformation techniques as indicated by user 112.

In FIG. 3, C0 represents the data in the rows of column C prior to transformation. C1 represents the data in the rows of column C after transformation using transformation technique TC1. C2 and C3 each represents the data in the rows of column C after transformation using transformation techniques TC2 and TC3, respectively. Likewise, D0 represents the data in the rows of column D without any transformation. D1 represents the data in the rows of column D after transformation using transformation technique TD1. D2 and D3 each represents the data in the rows of column D after transformation using transformation techniques TD2 and TD3, respectively.

A table T 310 stored within database 106 contains four columns, A, B, C and D. Columns C and D contain sensitive data, and each column has four (4) different transformation techniques for the data in that column. The four (4) different transformation techniques of C and the four (4) transformation techniques of D allow for query results that vary according to sixteen (16) different privacy or security levels, when processing queries that require data from columns C and D. C0 and D0 are transformation techniques that specify no changes are to be made to the data. Since each of columns C and D have four (4) possible transformation techniques, there are a total of 16 possible lenticular views T0 to T15. A lenticular view provides one viewpoint of sensitive data corresponding to one query context. The query context determines, at least in part, specific transformation techniques for each column with sensitive data, as indicated by the rules set by user 112. Actual implementations may have as many lenticular views as desired by user 112.

In FIG. 3, the different lenticular views that might be viewed by an end-user are as follows. T0 represents a lenticular view which has no transformation of the data in the rows of table T. For T0 lenticular view, the data in rows of columns C and D are not transformed, as represented by C0 and D0. For lenticular views T1 to T3, the data in the rows in column C are not transformed, but the data in the rows in column D are transformed. For lenticular view T2, database server 106 changes the rows of column D to different rows of values represented by D1. D1 represents a column of data, corresponding to column D, that has been transformed by transformation technique TD1. For lenticular view T2, database server 106 changes the rows of column D to different rows of values represented by D2. For lenticular view T3, database server 106 changes the rows of column D to different rows of values represented by D3.

T4, T5, T6, and T7 lenticular views require transformation of data in the rows of column C to new values represented by C1. T4, T5, T6, and T7 lenticular views each requires transformation of data in the rows of column D to new row values represented by D0, D1, D2, and D3, respectively. Note that D0 represents a transformation technique that performs no changes on the data.

Value Domain Transformations

Figure 4:
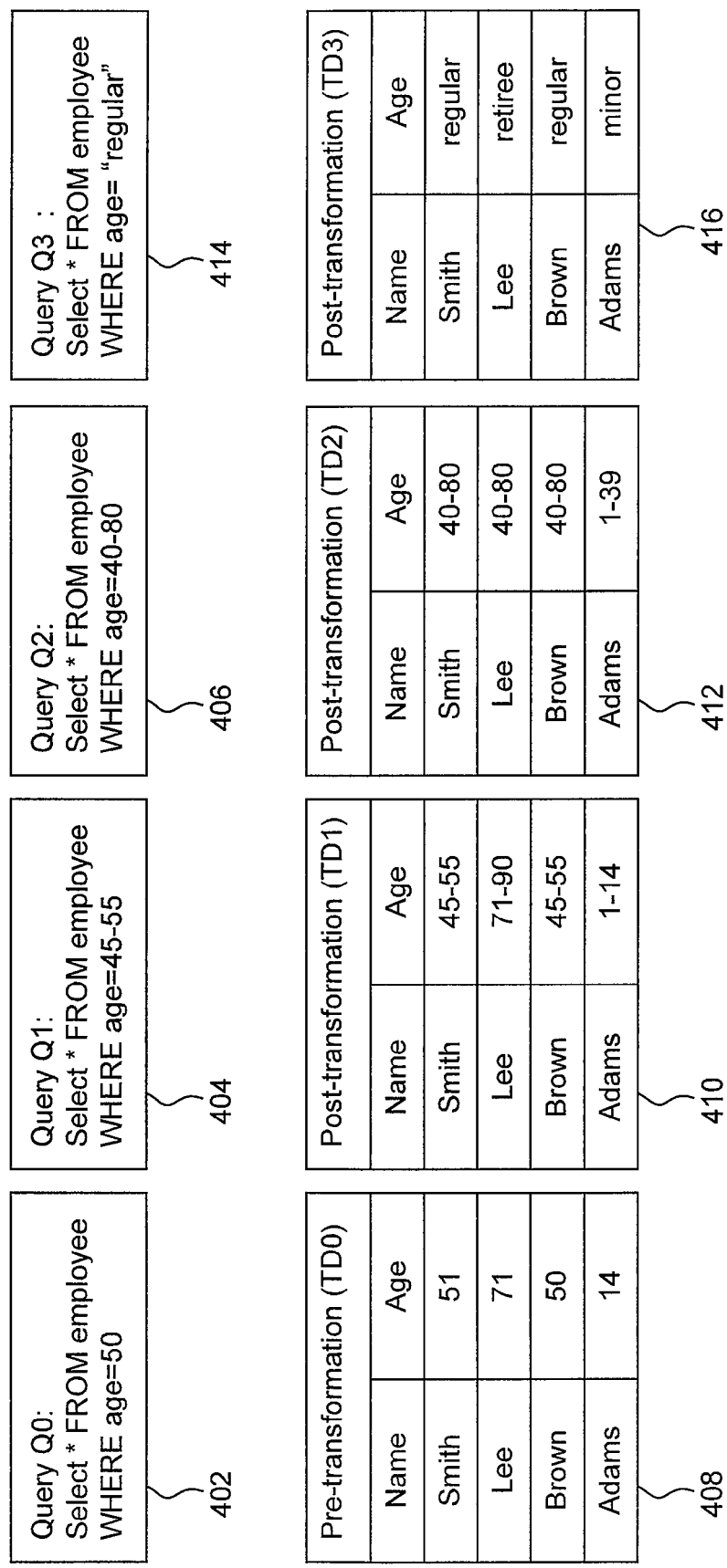
FIG. 4 is a block diagram illustrating transformation of query predicates and data, according to an embodiment.

FIG. 4 is a block diagram illustrating transformation of query predicates and data, according to an embodiment. For FIG. 4, assume that an end-user 102 issues a query to database application 104. Pre-transformation query 402 represents the query issued by end-user 102. Depending on the query context 104 associated with the query issued by end-user 102, database server 106 selects a proper transformation technique. In FIG. 4, a pre-transformation column 408 lists the ages of employees. Pre-transformation column 408 may be, for example, column D of table 310.

In some embodiments, a query result that includes transformed data ("post-transformation query result") may be a superset of the data that end-user 102 originally requested with respect to the untransformed query and untransformed data. The post-transformation query result is correct for the transformed query, but is overinclusive with respect to the untransformed query. The transformed query applied against the transformed data retrieves more rows of data than the untransformed query applied against untransformed data. As illustrated below, as compared with TD0, using transformation technique TD1, TD2, or TD3, database server 106 returns a query result that contains a greater superset of rows than if the data was not transformed.

In FIG. 4, depending on query context 304, database server 106 transforms pre-transformation query 402 to one of post-transformation queries Q1 404, Q2 406, or Q3 414, to match the transformation techniques TD1, TD2 or TD3, respectively. Column 408 shows the data in column D of table T 310 without any transformations. Column 410 shows the data in column D of table T 310 transformed using transformation technique TD1. Column 412 shows the data in column D of table T 310 transformed using transformation technique TD2. Column 416 shows the data in column D of table T 310 transformed using transformation technique TD3. Both transformation techniques TD1 and TD2 change the numeric value domain of the age data in the rows of column 408 to new values that are age range values from an age range value domain. Transformation technique TD3 changes the numeric value domain of the age data in the rows of column 408 to new values that are one of "minor", "regular", or "retiree".

Database server 106 selects a transformation technique to transform the data in the rows of column 408. Along with transforming the data in the rows of column 408, database server 106 also transforms the query that will be applied against the transformed data. Database server 106 may perform no change on the pre-transformation query 402 at all, if database server 106 also performs no change on the data. Database server 106 performs no change on the data and the query if database server 106 selects the transformation technique TD0, as indicated by query context 304.

The selection of TD1 to transform the data of column 408 to the data of column 410 causes database server 106 to replace the predicate clause "age=50" with "age=45-55", transforming query Q0 402 to query Q1 404. The selection of T2 to transform the data of column 408 to the data of column 412 causes database server 106 to replace the predicate clause "age=50" with "age=40-80", transforming query Q0 402 to query Q2 406. The selection of T3 to transform the data of column 408 to the data of column 416 causes database server 106 to replace the predicate clause "age=50" with "age=regular", transforming query Q0 402 to query Q3 414. Thus, database server 106 uses the same selected transformation technique for transforming the untransformed data and as the basis for transforming the predicates of the untransformed query.

Using the transformed query, database server 106 applies the transformed query against database 108 to retrieve sensitive data that has been transformed. If query context 304 allows for no transformation, then applying pre-transformation query Q0 402 to pre-transformation column 806, database server 106 retrieves "Brown", who is age 50.

If query context 304 requires using transformation technique TD1, then applying Q1 404 to post-transformation column 410, database server 106 retrieves "Brown", who is age 50, and "Smith", who is age 51, since both Brown and Smith are in the age group "age=45-55". Database server 106 returns the names and age range values for both Brown and Smith as part of the query result, and provides notification to end-user 102 that the query received was transformed to Q1 404.

If query context 304 requires using transformation technique TD2, database server 106 applies query Q2 406 to column 412. Database server 106 retrieves "Brown", age 50, "Smith", age 51, and "Lee", age 71, since Brown, Smith, and Lee are all in the age group "age=40-80". Database server 106 returns the names and age range values for Brown, Smith, and Lee as part of the query result, and provides notification to end-user 102 that the query received was transformed to query Q2 406.

If query context 304 requires using transformation technique TD3, database server 106 applies query Q3 414 to column 416. Database server 106 retrieves "Brown", age 50, and "Smith", age 51, since Brown, and Smith all satisfy the predicate age="regular". Database server 106 returns the names and age range values for Brown and Smith as part of the query result, and provides notification to end-user 102 that the query received was transformed to query Q3 414.

Data Precision

In some cases, transformation techniques affect the precision of the data. In some embodiments, depending on the selected transformation techniques, transformed data of one lenticular view may be more precise or less precise than transformed data of another lenticular view. Depending on the query context, sensitive data can be more generalized (with less precision), or less generalized (with more precision), when presented as a query result. Sensitive data may be presented to end-user 102 with no transformation for greatest precision of data, or may be presented to end-user 102 wholly transformed so that the transformed data reveals only very general information to end-user 102, or with any degree of transformation in between the two extremes described. For example, a database server may return an age range instead of a numeric age value. Although changing precision is one example use of transformation techniques, other uses of transformation techniques are possible that do not include changing precision. Transformation techniques are not limited to changing the precision of data and may specify any arbitrary changes to data.

Privacy Enforcement Operator

In some embodiments, a privacy enforcement operator enforces privacy rules set by user 112 for maintaining data privacy for sensitive data. The privacy enforcement operator may be part of database server 106, and enforces user rules in the kernel, as part of the query processing engine. After receiving a query, the privacy enforcement operator may check if lenticular views are defined, and provide the transformation techniques according to rules. If no lenticular views are defined, the privacy enforcement operator allows the normal processing of the query. The privacy enforcement operator may also perform the registration of rules received from user 112.

Hardware Overview

Figure 5:
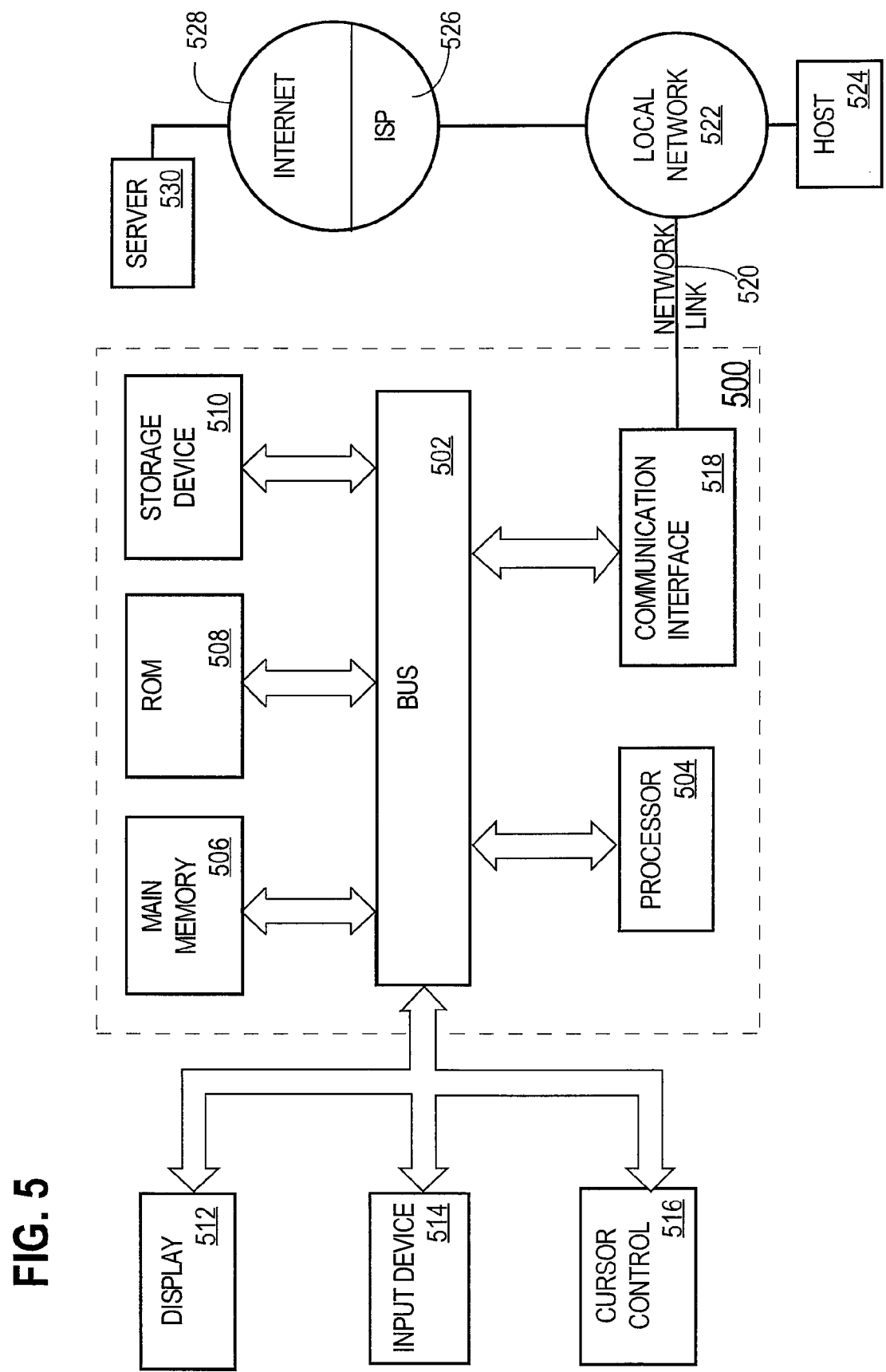
FIG. 5 is a block diagram depicting a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of controlling access to data in a database, comprising:
   registering a plurality of transformation techniques for a particular column of a table in said database;
   wherein at least two transformation techniques of said plurality of transformation techniques perform different transformations on actual values of said particular column;
   after registering the plurality of transformation techniques, receiving a plurality of queries, each query of said plurality of queries being associated with a respective query context and referencing said particular column;
   computing each query of said plurality of queries, wherein computing each query of said plurality of queries comprises:
      based on the respective query context of said each query, selecting a transformation technique from the plurality of transformation techniques registered for said particular column; and
      applying the selected transformation technique to the actual values in said particular column to generate transformed values to use for computing the query in lieu of the actual values in said particular column.

2. The computer-implemented method of claim 1, wherein said particular column stores a value from a first value domain, wherein each transformation technique of said plurality of transformation techniques transforms data to a second value domain different than said first value domain, wherein the method further includes:
   rewriting said each query to reflect the second value domain of said selected transformation technique.

3. The computer-implemented method of claim 2,
   wherein said each query contains a predicate referring to said particular column and to a value of said first value domain,
   wherein the method further includes rewriting said predicate to refer to a value from said second value domain of said selected transformation technique.

4. The computer-implemented method of claim 1, wherein one or more query context information is associated with each transformation technique of said plurality of transformation techniques using rules; wherein said rules are registered as part of registering said plurality of transformation techniques.

5. The computer-implemented method of claim 1, wherein a query result includes more data than said query result would have included if the actual values in said particular column are not transformed.

6. The computer-implemented method of claim 1, wherein selecting a transformation technique is performed by a kernel of a database server.

7. The computer-implemented method of claim 1, wherein said query context includes at least one of the identity of the end-user, the role of said end-user, and session attributes.

8. A non-transitory medium storing one or more sequences of instructions which, when executed by one or more processors, causes the one or more processors to perform:
   registering a plurality of transformation techniques for a particular column of a table in said database;
   wherein at least two transformation techniques of said plurality of transformation techniques perform different transformations on actual values of said particular column;
   after registering the plurality of transformation techniques, receiving a plurality of queries, each query of said plurality of queries being associated with a respective query context and referencing said particular column;
   computing each query of said plurality of queries, wherein computing each query of said plurality of queries comprises:
      based on the respective query context of said each query, selecting a transformation technique from the plurality of transformation techniques registered for said particular column; and
      applying the selected transformation technique to the actual values in said particular column to generate transformed values to use for computing the query in lieu of the actual values in said particular column.

9. The non-transitory medium of claim 8, wherein said particular column stores a value from a first value domain, wherein each transformation technique of said plurality of transformation techniques transforms data to a second value domain different than said first value domain, wherein the one or more sequences of instructions further comprise instructions which, when executed by one or more processors, causes the one or more processors to perform:
   rewriting said each query to reflect the second value domain of said selected transformation technique.

10. The non-transitory medium of claim 9,
wherein said each query contains a predicate referring to said particular column and to a value of said first value domain,
wherein the one or more sequences of instructions further comprise instructions which, when executed by one or more processors, causes the one or more processors to perform rewriting said predicate to refer to a value from said second value domain of said selected transformation technique.

11. The non-transitory medium of claim 8, wherein one or more query context information is associated with each transformation technique of said plurality of transformation techniques using rules; wherein said rules are registered as part of registering said plurality of transformation techniques.

12. The non-transitory medium of claim 8, wherein a query result includes more data than said query result would have included if the actual values in said particular column are not transformed.

13. The non-transitory medium of claim 8, wherein selecting a transformation technique is performed by a kernel of a database server.

14. The non-transitory medium of claim 7, wherein said query context includes at least one of the identity of the end-user, the role of said end-user, and session attributes.

* * * * *

UNITED STATES PATENT AND TRADEMARK OFFICE
CERTIFICATE OF CORRECTION

| | | |
|---|---|---|
| PATENT NO. | : 8,239,396 B2 | Page 1 of 1 |
| APPLICATION NO. | : 12/408551 | |
| DATED | : August 7, 2012 | |
| INVENTOR(S) | : Byun et al. | |

It is certified that error appears in the above-identified patent and that said Letters Patent is hereby corrected as shown below:

On the title page, item [56]: in column 2, under "Other Publications", line 2, delete "ACM/CSE-ER," and insert -- ACM/CSC-ER, --, therefor.

In column 14, line 10, in claim 14, delete "claim 7," and insert -- claim 8, --, therefor.

Signed and Sealed this
Sixth Day of November, 2012

David J. Kappos
*Director of the United States Patent and Trademark Office*